United States Patent
Sieben et al.

(10) Patent No.: US 9,610,729 B2
(45) Date of Patent: Apr. 4, 2017

(54) DEVICE AND METHOD FOR PERFORMING AND MONITORING A PLASTIC LASER TRANSMISSION WELDING PROCESS

(75) Inventors: Manuel Sieben, Grossenseebach (DE); Dominik Hertle, Erlangen (DE)

(73) Assignee: LPKF LASER & ELECTRONICS AG, Garbsen (DE)

( * ) Notice: Subject to any disclaimer, the term of this patent is extended or adjusted under 35 U.S.C. 154(b) by 110 days.

(21) Appl. No.: 14/235,145

(22) PCT Filed: Jul. 20, 2012

(86) PCT No.: PCT/EP2012/064244
§ 371 (c)(1),
(2), (4) Date: Jan. 27, 2014

(87) PCT Pub. No.: WO2013/014068
PCT Pub. Date: Jan. 31, 2013

(65) Prior Publication Data
US 2014/0150953 A1 Jun. 5, 2014

(30) Foreign Application Priority Data
Jul. 25, 2011 (DE) .......................... 10 2011 079 739

(51) Int. Cl.
*B32B 41/00* (2006.01)
*B29C 65/82* (2006.01)
(Continued)

(52) U.S. Cl.
CPC .......... *B29C 65/8253* (2013.01); *B29C 65/16* (2013.01); *B29C 65/1638* (2013.01);
(Continued)

(58) Field of Classification Search
CPC . B29C 65/00; B29C 65/1635; B29C 66/1122; B29C 66/91411; B29C 66/961;
(Continued)

(56) References Cited

U.S. PATENT DOCUMENTS

| 8,075,725 B2 | 12/2011 | Hofmann et al. |
| 2003/0090562 A1 | 5/2003 | Kubota et al. |

(Continued)

FOREIGN PATENT DOCUMENTS

| DE | 10121923 A1 | 11/2002 |
| DE | 102004036576 A1 | 3/2006 |

(Continued)

*Primary Examiner* — John Goff
*Assistant Examiner* — Joshel Rivera
(74) *Attorney, Agent, or Firm* — Browdy and Neimark, PLLC

(57) ABSTRACT

A device and a method for performing and monitoring a plastic laser transmission welding process includes a processing beam source for emitting a processing radiation into a joining zone between two joining members so that a weld seam is formed, a measuring beam source for irradiating a measuring zone with a measuring radiation, a detection unit for detecting the measuring radiation reflected by an interface between the weld seam and its surroundings in the joining members, and an evaluation unit connected to the detection unit for determining the depth position of the interface in the joining members from the detected reflected measuring radiation.

3 Claims, 6 Drawing Sheets

(51) Int. Cl.
    *B23K 26/06*    (2014.01)
    *B29C 65/00*    (2006.01)
    *B23K 31/12*    (2006.01)
    *G01J 5/00*     (2006.01)
    *B29C 65/16*    (2006.01)

(52) U.S. Cl.
    CPC ...... *B29C 65/1674* (2013.01); *B29C 66/1122* (2013.01); *B29C 66/41* (2013.01); *B29C 66/952* (2013.01); *B23K 26/0648* (2013.01); *B23K 31/125* (2013.01); *B29C 65/00* (2013.01); *B29C 65/1635* (2013.01); *B29C 65/1654* (2013.01); *B29C 66/836* (2013.01); *B29C 66/9161* (2013.01); *B29C 66/91216* (2013.01); *B29C 66/91411* (2013.01); *B29C 66/961* (2013.01); *G01J 5/0014* (2013.01); *G01J 2005/0081* (2013.01)

(58) Field of Classification Search
    CPC .......... B29C 66/91216; B29C 65/1638; B29C 66/952; B29C 66/9161; B29C 65/8253; B23K 26/023; B23K 26/246; B23K 26/426; B23K 26/0648; B23K 31/125; G01J 2005/0081; G01J 5/0014
    USPC ....... 156/64, 272.8, 350, 351, 359, 378, 379
    See application file for complete search history.

(56) References Cited

U.S. PATENT DOCUMENTS

2006/0153270 A1    7/2006    Matsumoto et al.
2012/0223061 A1*   9/2012    Atsumi et al. .......... 219/121.72

FOREIGN PATENT DOCUMENTS

| DE | 102007051688 A1 | 4/2009 |
| DE | 102008040813 A1 | 2/2010 |
| EP | 1575756 A1 | 9/2005 |
| WO | 2009052876 A1 | 4/2009 |
| WO | WO 2011030802 A1 * | 3/2011 |

* cited by examiner

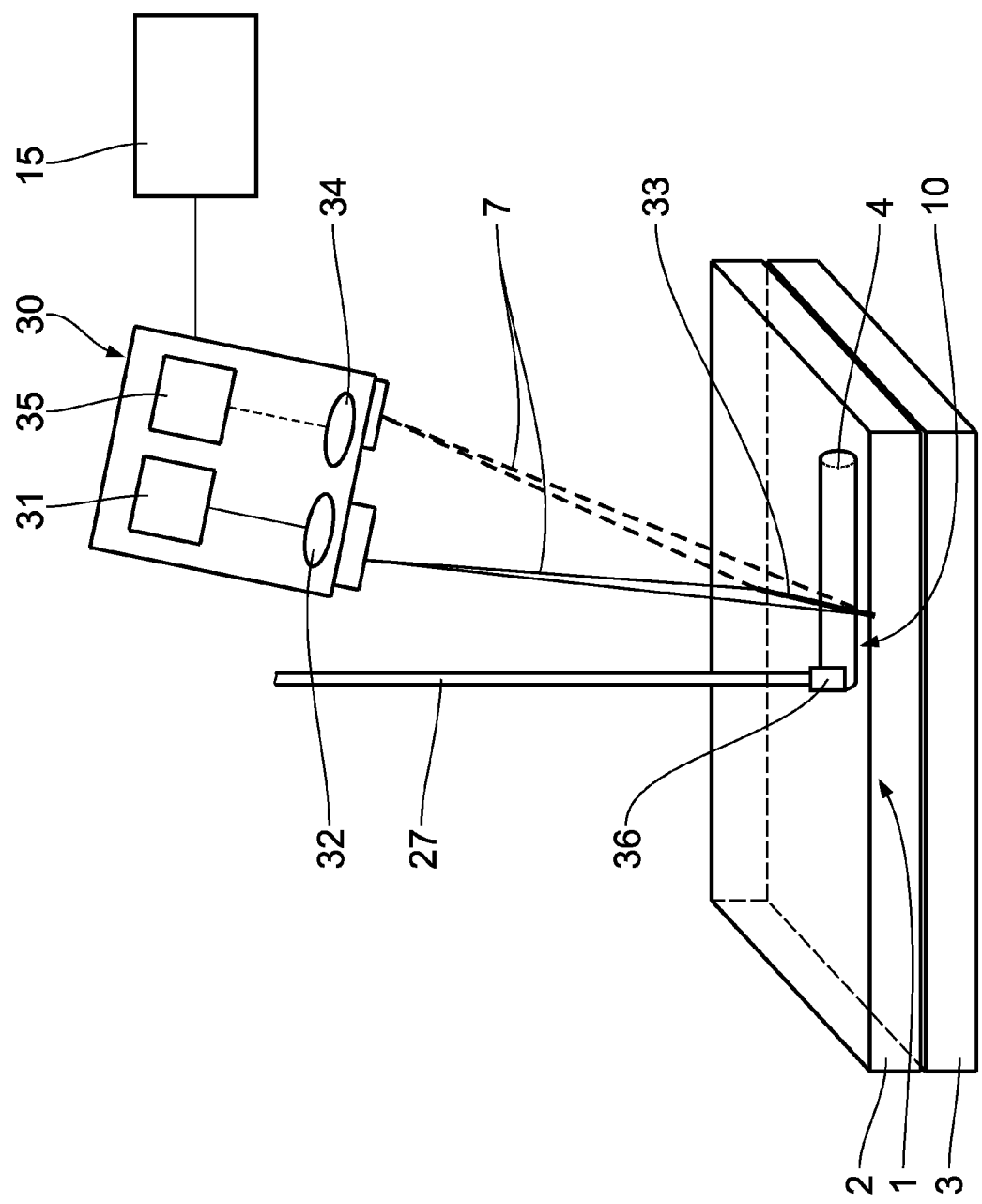

DEVICE AND METHOD FOR PERFORMING AND MONITORING A PLASTIC LASER TRANSMISSION WELDING PROCESS

CROSS-REFERENCES TO RELATED APPLICATIONS

This application claims the priority of Patent Application Serial No. DE 10 2011 079 739.4 filed on Jul. 25, 2011, pursuant to 35 U.S.C. 119(a)-(d), the content of which is incorporated herein by reference in its entirety as if fully set forth herein.

FIELD

The invention relates to a device for performing and monitoring a plastic laser transmission welding process, the device comprising a processing beam source for emitting a processing radiation into a joining zone between two joining members so that a weld seam is formed; a measuring beam source for irradiating a measuring zone with a measuring radiation; and a detection unit for detecting the measuring radiation reflected by an interface between the weld seam and its surroundings in the joining members, comprising an evaluation unit which is connected to the detection unit for determining the depth position of the interface in the joining members from the detected reflected measuring radiation, and further to a method for performing and monitoring a plastic laser transmission welding process, the method comprising the steps of arranging a transmissive and an absorptive joining member in a joining position; irradiating the joining members in a joining zone with a processing radiation so that a weld seam is formed and in a measuring zone comprising the weld seam with a measuring radiation; and detecting the measuring radiation reflected by an interface between the weld seam and its surroundings by means of a detection unit, the method comprising an evaluation of the detected measuring radiation by means of an evaluation unit connected to the detection unit so as to determine the depth position of the detected interface in the joining members.

BACKGROUND

The technology of plastic laser transmission welding is known from a number of publications, for instance EP 1 575 756 B1 or DE 10 2004 036 576 B4.

Generally speaking, a joining member which is transmissive of the laser processing radiation is placed on a joining member which absorbs said radiation. When a corresponding joining zone between the two joining members is exposed to radiation emitted through the transmissive joining member, a melt is produced in the absorptive joining member. Due to the contact with the transmissive joining member, a corresponding amount of heat energy is transported into the transmissive joining member, causing the transmissive joining member to melt in the welding zone as well, with the result that a corresponding mixing of the materials takes place between the two joining members. When the materials have cooled, a weld seam is formed between the two joining members which weld seam has a contour in the manner of a nugget in a direction transverse to the weld seam direction. Because of the different refractive powers of the two joining members and of the mixed material in the region of the weld seam, the interface of the nugget contour relative to its surroundings in the joining members is an optically active interface which is able to reflect a light beam.

A method for producing and monitoring a weld seam by means of laser radiation according to DE 101 21 923 C2 takes advantage of this feature in such a way that a radiation, which is referred to as control radiation in this disclosure, is emitted into a measuring zone comprising the weld seam, and the measuring radiation reflected by the interface is transmitted to a detection unit for detection.

This prior art monitoring procedure carried out on the weld seam only allows one to determine disturbances in the detected reflected measuring radiation caused by defects in the weld seam, which is supposed to trigger reactions. A reaction of this type may be the rejection of a workpiece that is determined to be defective.

SUMMARY

Based on these prior art methods, an object of the invention is to provide a device and a method for performing and monitoring a plastic laser transmission welding process which allows the interface between the weld seam and its surroundings in the joining members to be detected with greatly improved significance.

This object is achieved under device-related aspects by a device comprising an evaluation unit which is connected to the detection unit for determining the depth position of the interface in the joining members from the detected reflected measuring radiation, and under procedural aspects by a method comprising an evaluation of the detected measuring radiation by means of an evaluation unit connected to the detection unit so as to determine the depth position of the detected interface in the joining members. This allows for a much more precise examination of the welding process since the depth position of the interface not only allows one to determine the absolute depth position of the weld seam in the joining zone between the two joining members but also if a sufficient cross-sectional surface of the weld seam is present between the two joining members or if a weld seam is present at all.

The optical-technical implementation of determining the depth position of the interface—referred to as "welding depth monitoring" in the following—is conceivable by means of different devices and methods. In an advantageous embodiment of the invention, it is for example provided to use a point light source for generating the measuring radiation which is variably focusable onto the measuring zone by means of a focusing optical system arranged in the beam path of the measuring beam. A photo detector is used as detection unit in order to detect the intensity of the reflected measuring beam as a function of the focal position relative to the interface. If the focus is located in the interface, the reflection intensity is high. Therefore, the correlation between the position of the focusing optical system and the intensity of the reflected measuring beam allows the depth position of the interface to be determined.

According to another alternative embodiment for determining the depth position, it is conceivable to use a chromatic confocal measuring system. According thereto, the measuring beam source is a polychromatic point light source which is focused in distance-coded manner onto the measuring zone by means of a high-dispersion focusing optical system which is arranged in the beam path of the measuring beam and is focusing same into several partial measuring beams as a function of the respective wavelength. A spectral-sensitive photo detector serving as detection unit detects the reflected partial measuring beam with the highest intensity as a function of the focal position relative to the interface so as to determine the depth position of the interface. Distance coding of the partial measuring beams may be performed using a focusing optical system comprising a focusing lens and a distance coding lens in particular configured as a Fresnel lens. In a preferred embodiment, the spectral-sensitive photo detector may also be formed by a spectrometer comprising an aperture arranged in front thereof.

In order to simplify the beam guidance of processing and measuring beam according to another preferred embodiment, an optical waveguide is in each case provided to guide the measuring beam to the focusing optical system and the reflected measuring beam to the detection unit, which optical waveguides are then combined, by means of an optical fiber coupler, to form a common beam path in the focusing optical system and the measuring zone.

In another alternative embodiment for the optical system for welding depth monitoring, a triangulation arrangement of measuring beam source and detection unit is used which is known per se. According thereto, the measuring radiation is generated by a triangulation laser beam emitted into the welding zone, wherein the measuring radiation thereof, which is reflected as a function of the depth position of the interface, is detected by a detection unit in the form of an image sensor. The results are used to determine the depth position of the interface according to the principles of laser triangulation.

A similar alternative optical principle is the so-called light section method which is set forth as another alternative embodiment according to which a light section sensor is provided which comprises the measuring beam source and the detection unit. The measuring beam source is configured in such a way as to project a measuring light line onto the measuring zone, in other words the weld seam to be examined. An imaging optical system in the light section sensor images the reflected measuring image of the measuring light line onto a corresponding image sensor which can be evaluated to determine the depth position of the interface between the weld seam and the surroundings in the joining members according to the principles of the light section method.

The welding depth monitoring method according to the invention may be used in a particularly advantageous manner in a so-called laser hybrid welding method as it is known from EP 1 575 756 B1 mentioned at the outset. The secondary light source described there may be used as a measuring beam source for welding depth monitoring according to the present invention.

Consequently, the present invention is particularly suitable for a process control within plastic laser transmission welding processes performed in the fields of contour welding or laser hybrid welding the operating principle of which process control is based on the reflection of light on material interfaces and the resulting "depth measurement" of the weld seam interface.

Further features, details and advantages of the invention will become apparent from the ensuing description of exemplary embodiments in conjunction with the drawing.

BRIEF DESCRIPTION OF THE DRAWINGS

FIG. 2 shows a schematic representation of the displaceable focusing optical system the embodiment is provided with;

FIG. 4 shows a schematic representation of a distance-coded focusing optical system the embodiment is provided with;

FIG. 10 shows a schematic perspective view of a device for performing and monitoring a plastic laser transmission welding process in another embodiment based on the light section method.

DETAILED DESCRIPTION

Figure 1:
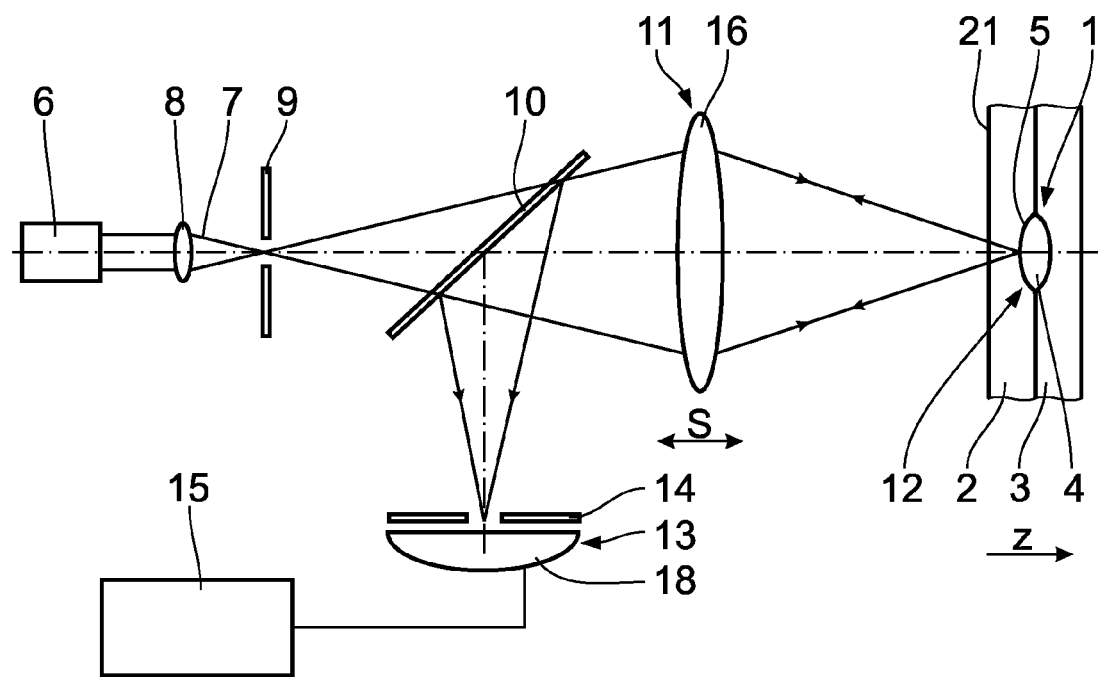
FIG. 1 shows a schematic representation of a first embodiment of an optical measuring device for welding depth monitoring.

FIG. 1 shows a first embodiment of a device for performing and monitoring a plastic laser transmission welding process. The processing light beam source for generating and emitting a laser beam serving as processing radiation into the joining zone 1 of the two joining members 2, 3 is not shown in more detail as it corresponds to that used in conventional laser transmission welding. This processing beam source is used to form a weld seam 4 between the two joining members 2, 3 which is shown in a cross-sectional view between the two joining members 2, 3 according to FIG. 1.

For determining the depth position of the interface 5 between the weld seam 4 and the joining members 2, 3—in other words for welding depth monitoring in the corresponding laser transmission welding process—a measuring beam source 6 in the form of a point light source is provided the measuring beam 7 of which is processed by a lens 8 and an aperture 9 so that a focused beam is obtained which is then emitted into the measuring zone 12 in the region of the weld seam 4 through a beam splitter 10 via a focusing optical system. The corresponding focal spot of the measuring beam 7 is reflected by the optically active interface 5 between the weld seam 4 and the joining member 2 and imaged, via the focusing optical system 11 and the beam splitter 10, through an aperture 14 into a detection unit 13. In this embodiment, the detection unit 13 is a photo detector which is coupled to a corresponding evaluation unit 15. The measuring principle for the depth position of the interface 5 is based on the fact that when the interface 5 is located in the focal plane, the measuring beam source 6 is well focused onto the detection unit 13, allowing a high light intensity to be measured. When the interface 5 is located outside the focal plane, the measuring light source 6 is badly focused onto the photo detector of the detection unit 13, with the result that the intensity is correspondingly lower.

A distance measurement can only be performed by a variable focusing of the measuring beam 7 in the measuring zone 12 as shown in FIG. 12. According thereto, the focusing optical system 11 is displaced by a scanning movement S, wherein the depth position of the interface 5 is correlated with one of the scanning positions $P_1$, $P_2$, $P_3$ of the focusing optical system 11. The intensity changes as a function of the distance z between the focal plane and the interface in accordance with the following point spread function:

$$I(z) = \frac{\Phi}{[\tan(\alpha) \times Z \times rf] \times \pi}$$

Figure 2:
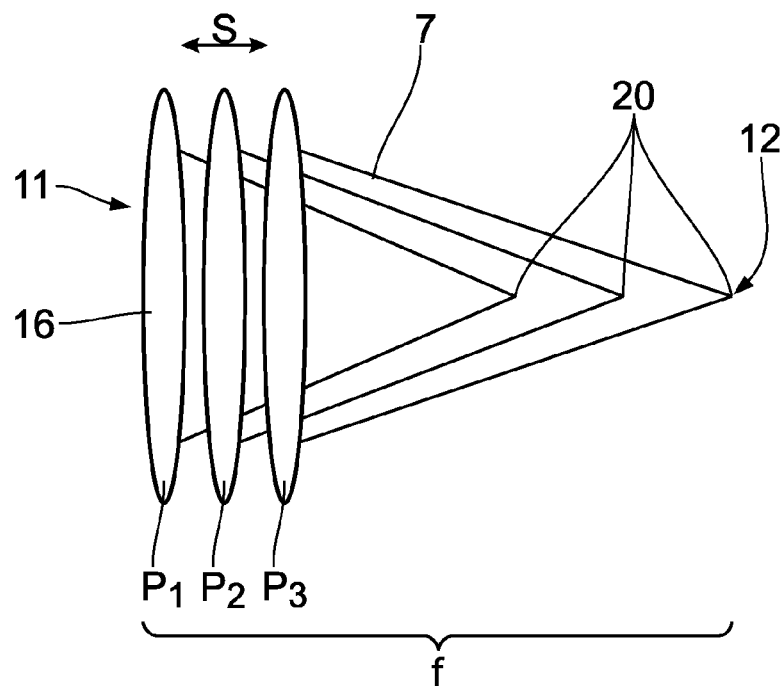
Figure 3:
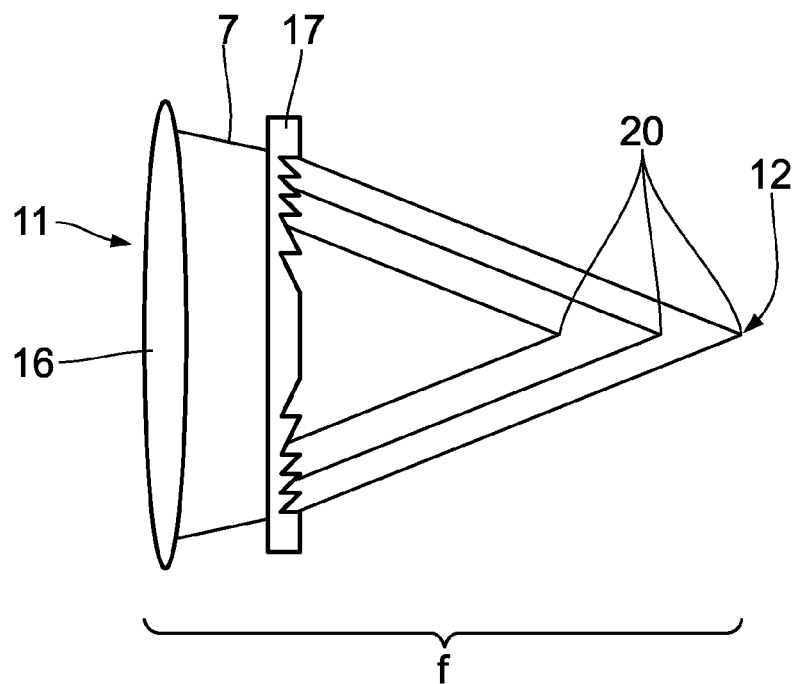
FIG. 3 shows a schematic representation of a second embodiment of an optical measuring device for welding depth monitoring.
Figure 4:
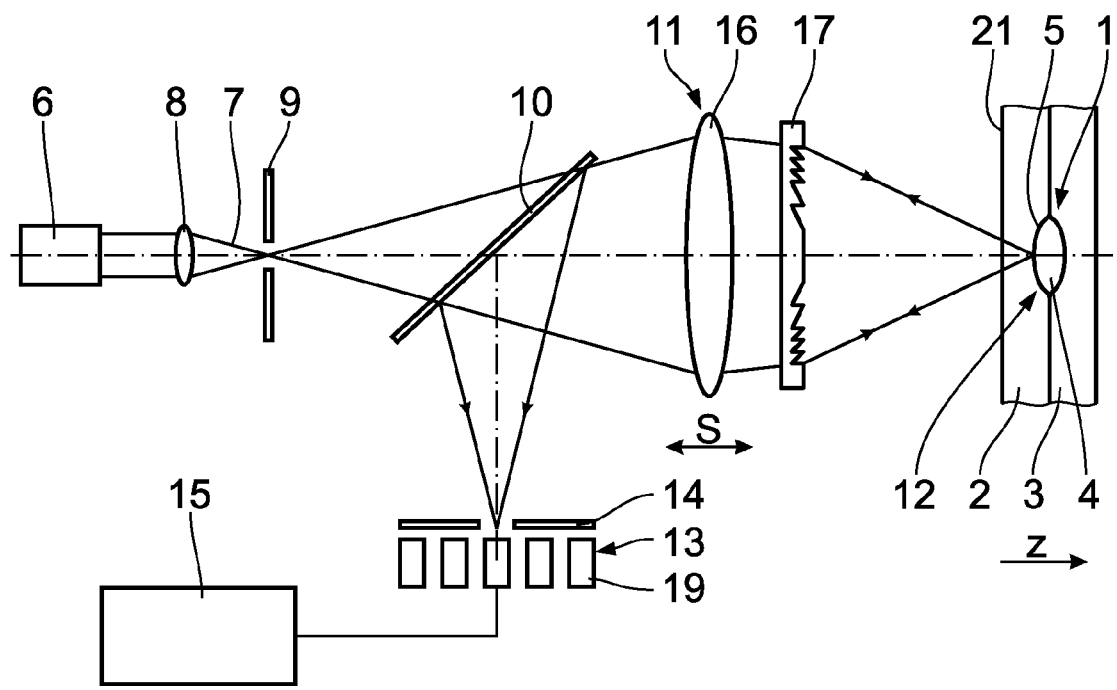
Figure 5:
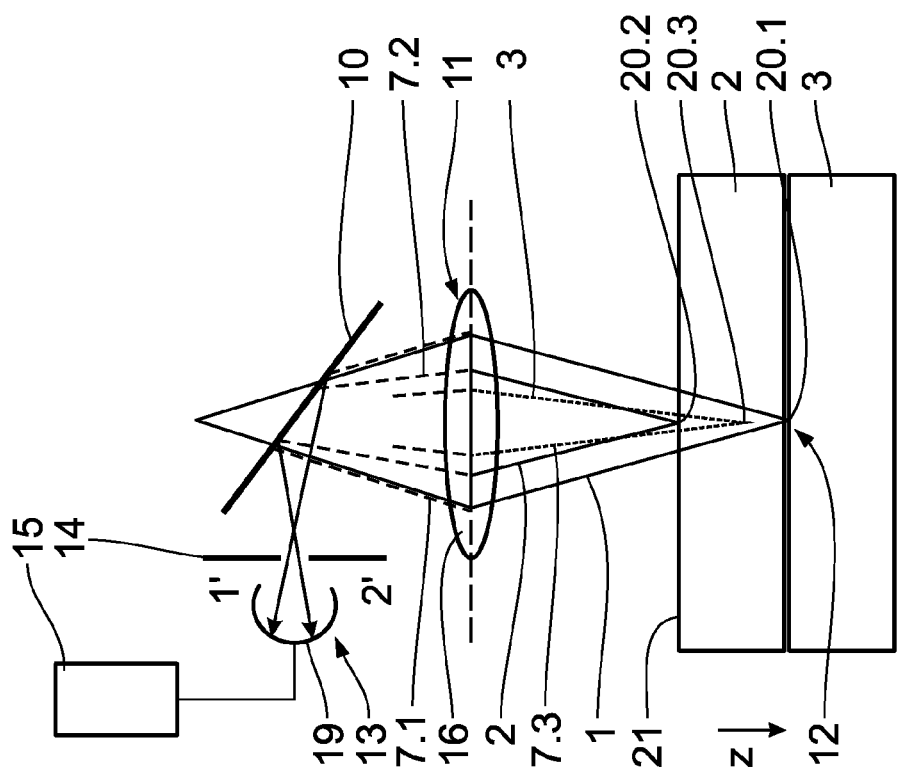

Definition:
α=divergence angle
φ=light flow emitted by the beam source of the process monitoring system
Z=distance of the reflection plane from the focal position
rf=spot radius Another embodiment of a device and a method for performing and monitoring a plastic laser transmission welding process shall be explained by means of FIGS. 3 to 6. This embodiment and the embodiment according to FIGS. 1 and 2 have some features in common, namely the measuring beam source 6, the processing thereof via a lens 8 and an aperture 9 and the beam splitter 10. The measuring beam source 6, however, is a polychromatic point light source which with a focuses the measuring beam 7 into the measuring zone as a function of its wavelength in a number of partial measuring beams 7.1, 7.2, 7.3 (FIGS. 5 and 6) as a function of their wavelengths. To this end, advantage is taken of the dispersing effect of the focusing optical system. In this measuring configuration, the focusing optical system is made of a material that has a high Abbe number which leads to a chromatic aberration. As indicated in FIGS. 3 and 5, said chromatic aberration allows the focal distance f of the respective focal point from the focusing optical system 11 to be coded chromatically.

In this embodiment, the detection unit 13 is a spectral-sensitive photo detector in the form of a spectrometer 19 that is arranged behind the aperture 14 and allows the spectral intensity curve of the reflected measuring beam to be determined. The spectrometer 19 detects the reflected wavelength 7 with the highest intensity as a function of the focal position relative to the interface 5. These results may then be evaluated by the evaluation unit 15 to determine the depth position of the interface 5 and therefore the depth position of the weld seam 4.

Figure 6:
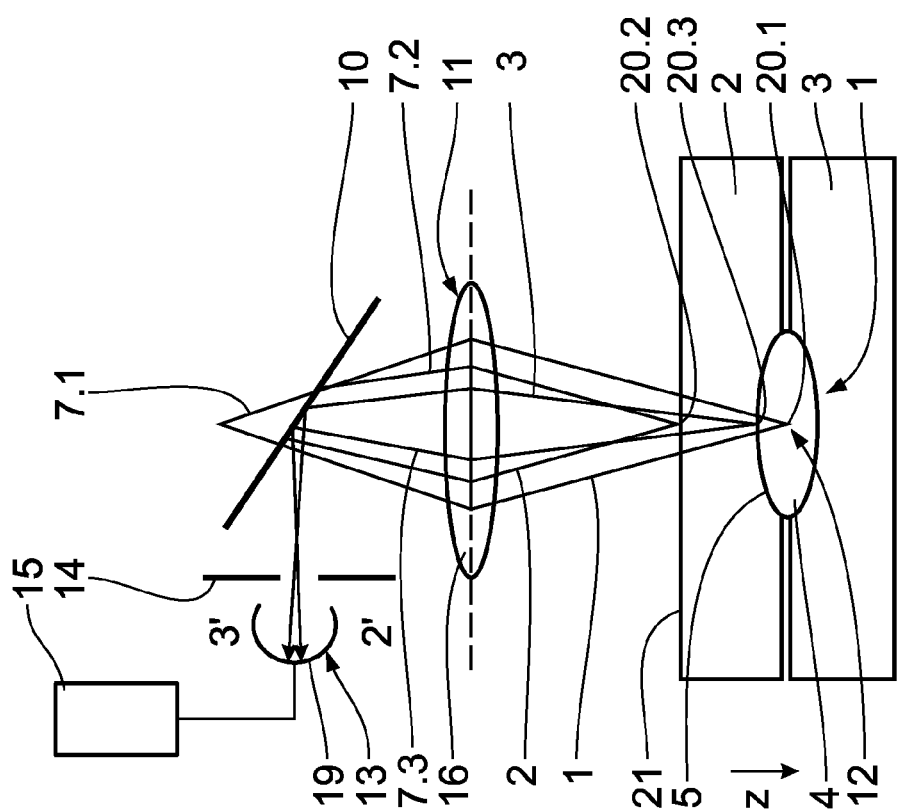
FIGS. 5 and 6 show more detailed representations of the optical measuring device according to FIG. 3 before and after welding is performed between the two joining members.

This shall be explained in more detail by means of FIGS. 5 and 6. FIG. 5 shows the transmissive joining member 2 and the absorptive joining member 3 prior to welding. When the polychromatic measuring beam 7 is focused as a function of its wavelength, a number of exemplary focal points 20.1, 20.2, 20.3 are obtained in the z-direction (depth) in the joining members 2, 3 as a function of the respective wavelength λ1, λ2, λ3. The beam, which is assigned to the wavelength λ1 and the focal point 20.1 of which is located in the region of the interface between the two joining members 2, 3, and the partial measuring beam 7.2, which is assigned to the wavelength λ2 and the focal point 20.2 of which is located on the outer surface 21 of the upper joining member 2, are reflected with a particularly high intensity. This can be measured by the spectrometer 19, as shown by the reflected partial measuring beams 7.1 and 7.2 impinging on the spectrometer 19, having the wavelengths λ1' and λ2', respectively. These results are evaluated by the evaluation unit 15 to determine the corresponding positions of the interface 5 between the two joining members 2, 3 and the surface 21 of the upper joining member 2.

Having performed the welding process during which the weld seam 4 was produced as indicated in FIG. 6, the focal point 20.3 of the partial measuring beam 7.3 will now be located in the interface 5 migrated upwards into the transmissive joining member 2 where it is reflected with a particularly high intensity. A corresponding intensity shift is detected by the spectrometer 19. The depth position of the interface 5 between the weld seam 4 and the upper joining member 2 may now be determined by means of the wavelength of the partial measuring beam 7.3 reflected with a maximum intensity.

Figure 7:
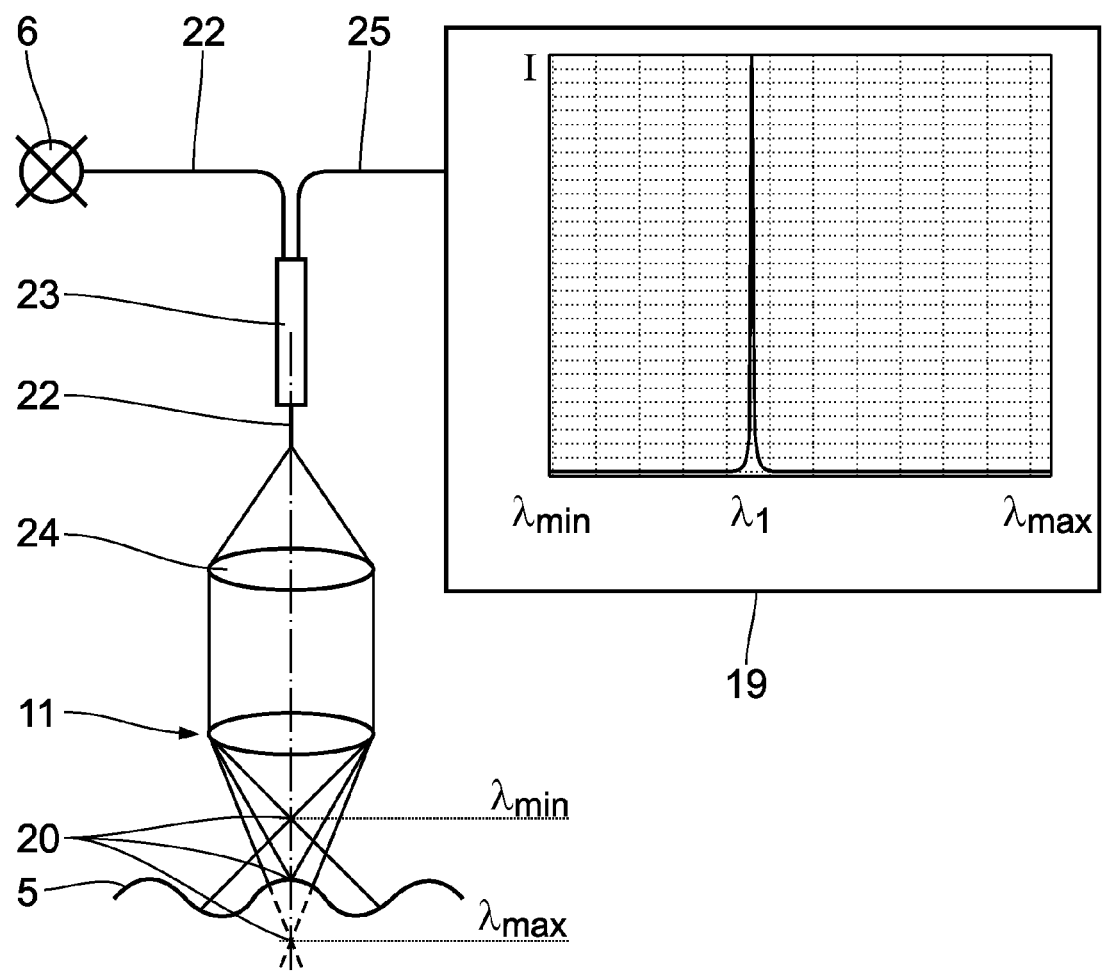
FIG. 7 shows an alternative embodiment for the optical measuring device according to FIG. 3.

FIG. 7 shows an alternative embodiment of the measuring device which slightly differs from that shown in FIG. 1 or 4, respectively. The measuring beam is guided from the measuring beam source 6 via a first optical fiber 22, which is provided with a fiber coupler 23, to a collimating lens 24 and to a focusing optical system 11 the focus of which is again wavelength-dependent. The reflected measuring beams 7 are correspondingly imaged by this optical arrangement and guided to the spectrometer 19 via the fiber coupler 23 and another optical waveguide 25. FIG. 7 shows a spectral diagram of the reflected measuring radiation 7 having a maximum intensity at the wavelength λ1. This wavelength may be used to determine the position of the interface 5 in the z-direction within the limits defined by the minimum wavelength $\lambda_{min}$ and the maximum wavelength $\lambda_{max}$ of the polychromatic measuring radiation 7.

Figure 8:
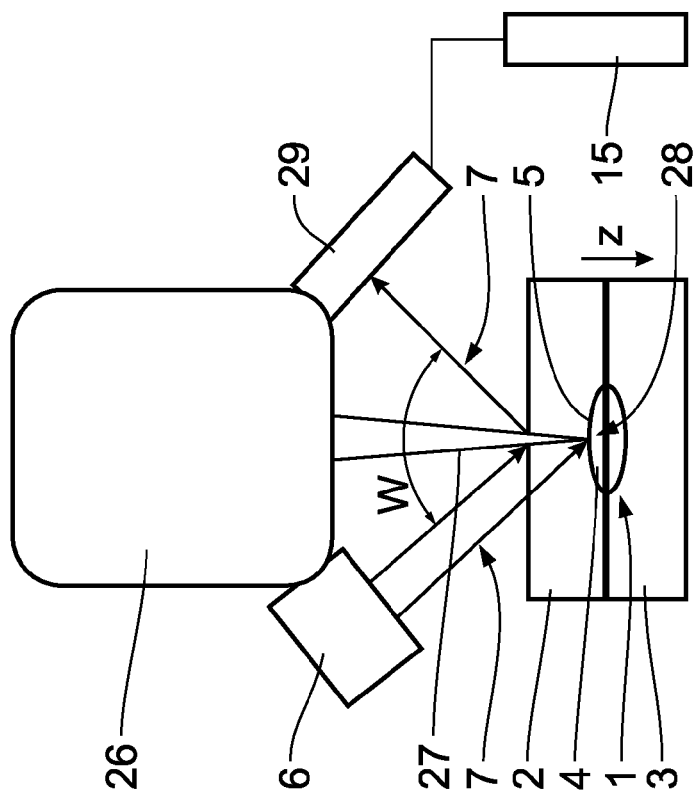
FIGS. 8 and 9 show schematic representations of a device for performing and monitoring the welding depth in a plastic laser transmission welding process in another embodiment based on the laser triangulation method.
Figure 9:
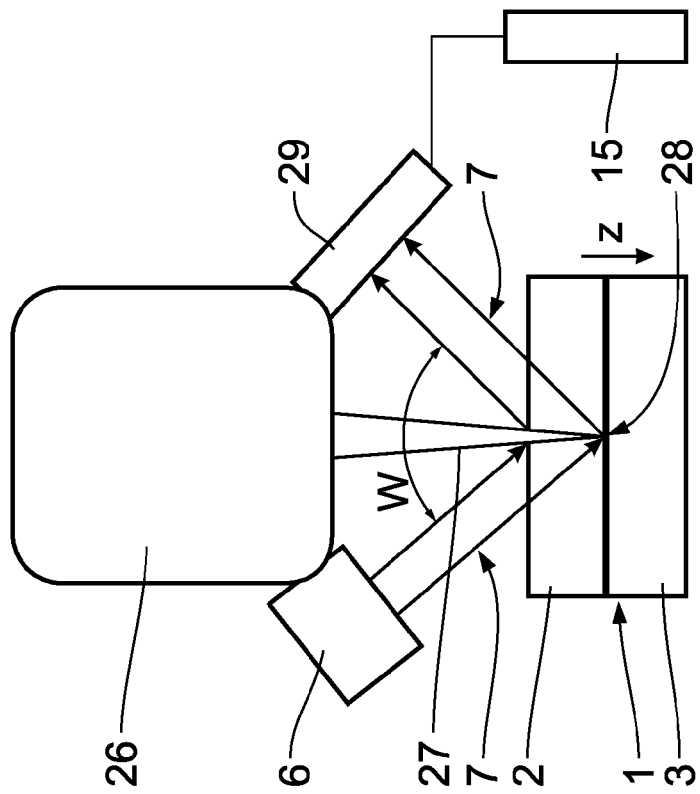

FIGS. 8 and 9 show another embodiment of a device and a corresponding method for performing and monitoring a plastic laser transmission welding process. This diagrammatic representation shows a processing beam source 26 in the form of a conventional laser processing optical system which emits a processing beam 27 into the joining zone 28 between the transmissive joining member 2 and the absorptive joining member 3. As a result, the weld seam 4 shown in FIG. 9 is formed the interface 5 of which faces in the direction of the transmissive joining member 2.

In the embodiment shown here, monitoring of the weld seam 4 by welding depth monitoring is performed on the basis of a triangulation arrangement which is composed of a laser source serving as measuring beam source 6 and a receiver in the form of an image sensor 29 serving as detection unit 13—a so-called CCD stack—arranged opposite thereto. The following information is provided to shortly outline the background to triangulation. The general principle of triangulation is based on a distance measurement that is performed by taking advantage of the geometric relationships in a triangle. The method is carried out by means of a laser beam which is guided to a reflective surface at a particular angle. The beam thrown back by direct reflection hits a CCD array which absorbs the intensity distribution unidimensionally. The angle of incidence of the laser beam on the measuring arrangement is kept constant; a change in distance therefore results in a "horizontal" shift on the CCD stack. By determining the position and taking into account the angular relationships, the evaluation unit is able to determine the distance between sensor and measuring arrangement.

Since the weld seam 4 is formed by laser transmission welding which causes the base materials of the joining members 2, 3 to mix so that a weld nugget is formed, the reflected measuring beam 7 may also be detected at the interface 5 formed in this area. To this end, the laser measuring beam 7 is coupled into the material at a defined angle W. By means of the image sensor 29 configured as a CCD stack, the position of the reflected light beam is determined and evaluated. The angular relationships and—if necessary—the refractive behavior of the joining members 2, 3 allow the respective radiation beam length between the upper surface and the interface 5 and therefore the depth position of the weld seam 4 to be determined.

The embodiment of the invention shown in FIG. 10 is a further development of the welding depth determination method based on laser triangulation. In this embodiment, a so-called light section sensor 30 is used which is on the one hand provided with a laser diode 31 comprising a particular optical processing system 32 by means of which a measuring light line 33 is projected onto the object to be examined.

On the other hand, the light section sensor 30 is provided with another imaging optical system 34 by means of which the light of the light line 33 which is diffusely reflected by the joining members 2, 3 is imaged onto a detection unit 13 in the form of a sensor matrix 35 such as a CCD or CMOS matrix. The camera image is evaluated by a corresponding evaluation unit 15 in the form of a controller to determine the corresponding distance information, in other words the position of a corresponding reflection point in the z-direction and the position along the measuring line 33 (x-axis). The height profile of the object to be measured, which represents the profile of the weld seam 4 in the x-direction, can then be displayed in a corresponding two-dimensional coordinate system.

As can be seen in FIG. 10, this measuring procedure allows one to instantly monitor the depth position and the contour of the weld seam 4 which has just been produced by means of the processing beam 27. If the measured values deviate from the standard values, the parameters of the processing beam 27 may be changed to correspondingly influence the melt 36 and therefore the weld seam 4 formed between the two joining members 2, 3.

When the processing beam 27 is moved together with the light section sensor 30 in the y-direction along the joining members 2, 3 to be joined, this allows one to capture a three-dimensional image of the weld seam 4. The same result is obtained when the joining members 2, 3 are moved relative to the processing beam 27 the light section sensor 30.

To conclude, the welding depth monitoring process according to the invention based on the respective reflections of the measuring beam 7 allows one to determine conformity with required dimensions by measurement-technological means and to monitor the overall weld seam quality.

The invention claimed is:

1. A method for performing and monitoring a plastic laser transmission welding process, comprising the following steps:
   arranging a transmissive joining member (2) and an absorptive joining member (3) in a joining position;
   irradiating the joining members (2, 3) in a joining zone (1) with a laser processing radiation (27) so that a weld seam (4) is formed and in a measuring zone (12) comprising the weld seam (4) with a measuring radiation (7);
   detecting the measuring radiation (7) reflected by an interface (5) between the weld seam (4) and its surroundings by means of a detection unit (13); and
   evaluating the detected measuring radiation (7) by means of an evaluation unit (15) connected to the detection unit (13) so as to determine a depth position of the detected interface (5) in the joining members (2, 3);
   wherein the measuring radiation (7) is generated by a polychromatic point light source (6) and emitted into the measuring zone (12) with a focus that is a function of the respective wavelength; and
   wherein the measuring radiation (7), which is reflected as a function of the depth position of the interface, is spectrally detected, and the depth position of the interface (5) is determined by evaluation of a spectral intensity maximum of the reflected measuring radiation (7).

2. A method for performing and monitoring a plastic laser transmission welding process, comprising the following steps:
   arranging a transmissive joining member (2) and an absorptive joining member (3) in a joining position:
   irradiating the joining members (2, 3) in a joining zone (1) with a laser processing radiation (27) so that a weld seam (4) is formed and in a measuring zone (12) comprising the weld seam (4) with a measuring radiation (7);
   detecting the measuring radiation (7) reflected by an interface (5) between the weld seam (4) and its surroundings by means of a detection unit (13); and
   evaluating the detected measuring radiation (7) by means of an evaluation unit (15) connected to the detection unit (13) so as to determine a depth position of the detected interface (5) in the joining members (2, 3); and
   wherein the measuring radiation (7) is formed by a triangulation laser beam which is emitted into the measuring zone (12), wherein the measuring radiation (7) thereof, which is reflected as a function of the depth position of the interface (5), is detected by an image sensor (29) serving as detection unit and the depth position of the interface (5) is determined according to the principles of laser triangulation.

3. The method according to claim 1, wherein the measuring zone (12) is irradiated with a secondary radiation generated during laser beam hybrid welding.

* * * * *